(12) United States Patent
Bitran et al.

(10) Patent No.: US 12,382,548 B2
(45) Date of Patent: Aug. 5, 2025

(54) COLLABORATION AMONG WIRELESS DEVICES OPERATING OVER BOTH LONG-RANGE AND SHORT-RANGE NETWORKS

(71) Applicant: ALTAIR SEMICONDUCTOR LTD., Hod Hasharon (IL)

(72) Inventors: Yigal Bitran, Ramat Hasharon (IL); Lavi Semel, Tel Aviv (IL); Dima Feldman, Ramat Hasharon (IL)

(73) Assignee: Sony Semiconductors Solutions Corporation, Kanagawa (JP)

( * ) Notice: Subject to any disclaimer, the term of this patent is extended or adjusted under 35 U.S.C. 154(b) by 565 days.

(21) Appl. No.: 16/734,442

(22) Filed: Jan. 6, 2020

(65) Prior Publication Data

US 2020/0221542 A1    Jul. 9, 2020

Related U.S. Application Data

(60) Provisional application No. 62/790,032, filed on Jan. 9, 2019.

(51) Int. Cl.
*H04W 88/04* (2009.01)
*H04L 67/00* (2022.01)
(Continued)

(52) U.S. Cl.
CPC ............ *H04W 88/04* (2013.01); *H04L 67/34* (2013.01); *H04W 12/04* (2013.01); *H04W 12/55* (2021.01);
(Continued)

(58) Field of Classification Search
CPC ..... H04W 88/04; H04W 88/06; H04W 88/02; H04W 84/18; H04W 84/042;
(Continued)

(56) References Cited

U.S. PATENT DOCUMENTS

2008/0069105 A1\* 3/2008 Costa ................. H04L 63/0853
370/392
2015/0078466 A1\* 3/2015 Zhou ..................... H04W 8/005
375/260
(Continued)

FOREIGN PATENT DOCUMENTS

JP    2013021515 A    1/2013
JP    2013541284 A1   11/2013
(Continued)

OTHER PUBLICATIONS

European Application # 20150510.4 search report dated May 27, 2020.

(Continued)

*Primary Examiner* — Ricardo H Castaneyra
(74) *Attorney, Agent, or Firm* — Meitar Patents Ltd.; Daniel Kligler

(57) ABSTRACT

A communication device includes a long-rage transceiver, a short-range transceiver and a processor. The long-range transceiver is configured to communicate wirelessly with a Base Station (BS) of a cellular network. The short-range transceiver is configured to communicate wirelessly with one or more peer communication devices over a short-range network. The processor is configured to communicate with the peer communication devices via the short-range transceiver and with the BS via the long-range transceiver, so as to share resources between the communication device and the peer communication devices or the cellular network, for providing a communication service.

30 Claims, 5 Drawing Sheets

(51) Int. Cl.
    *H04W 12/04*    (2021.01)
    *H04W 12/55*    (2021.01)
    *H04W 52/02*    (2009.01)
    *H04W 56/00*    (2009.01)
    *H04W 68/00*    (2009.01)
    *H04W 76/14*    (2018.01)
    *H04W 84/04*    (2009.01)

(52) U.S. Cl.
    CPC ... *H04W 52/0225* (2013.01); *H04W 56/0015* (2013.01); *H04W 68/005* (2013.01); *H04W 76/14* (2018.02); *H04W 84/042* (2013.01)

(58) Field of Classification Search
    CPC . H04W 12/04; H04W 12/55; H04W 52/0225; H04W 56/0015; H04W 68/005; H04W 76/14; H04W 68/02; H04L 67/34
    USPC .......................... 370/315, 329, 252, 280, 330
    See application file for complete search history.

(56) References Cited

U.S. PATENT DOCUMENTS

| | | | | |
|---|---|---|---|---|
| 2015/0195863 | A1* | 7/2015 | Reznik | H04W 76/11 |
| | | | | 370/236 |
| 2015/0319724 | A1* | 11/2015 | Chae | H04L 27/261 |
| | | | | 370/315 |
| 2016/0135242 | A1* | 5/2016 | Hampel | H04W 76/14 |
| | | | | 370/329 |
| 2018/0084384 | A1* | 3/2018 | Venkatraman | H04W 64/00 |
| 2018/0199390 | A1* | 7/2018 | Hahn | H04B 7/2606 |
| 2018/0234163 | A1* | 8/2018 | Yasukawa | H04W 16/26 |
| 2018/0246926 | A1* | 8/2018 | Altaf | G06F 16/215 |
| 2018/0279202 | A1* | 9/2018 | Tenny | H04W 40/246 |
| 2018/0287689 | A1* | 10/2018 | Lee | H04W 48/16 |
| 2019/0042227 | A1* | 2/2019 | Sharma | H04L 67/34 |
| 2019/0223008 | A1* | 7/2019 | Vanderveen | H04L 9/0825 |
| 2019/0261309 | A1* | 8/2019 | Martin | H04W 24/08 |
| 2020/0092928 | A1 | 3/2020 | Shi et al. | |

FOREIGN PATENT DOCUMENTS

| | | |
|---|---|---|
| JP | 2017208697 A | 11/2017 |
| JP | 2018503327 A | 2/2018 |
| JP | 2018503992 A | 2/2018 |
| JP | 2018534854 A | 11/2018 |
| WO | 2017065895 A1 | 4/2017 |

OTHER PUBLICATIONS

3GPP TS 36.321 V15.7.0, "3rd Generation Partnership Project; Technical Specification Group Radio Access Network; Evolved Universal Terrestrial Radio Access (E-UTRA); Medium Access Control (MAC) protocol specification, Release 15", pp. 1-134, Sep. 2019.

3GPP TS 36.211 V15.5.0, "3rd Generation Partnership Project; Technical Specification Group Radio Access Network; Evolved Universal Terrestrial Radio Access (E-UTRA);Physical channels and modulation, Release 15", pp. 1-238, Mar. 2019.

"Bluetooth Core Specification" v5.1, pp. 1-2985, Jan. 21, 2019.

EEE Std 802.15.4, "IEEE Standard for Local and metropolitan area networks: Part 15.4: Low-Rate Wireless Personal Area Networks (LR-WPANs)", pp. 1-314, 2011.

JP Application # 2020-000584 Office Action dated Nov. 14, 2023.

"3rd Generation Partnership Project; Technical Specification Group Services and System Aspects; Study on Architecture Enhancement to ProSe UE-to-Network Relay (Release 15)," 3GPP TR 23.733, 3rd Generation Partnership Project (3GPP), Mobile Competence Center, vol. SA WG2, No. V15.0.0, pp. 1-81, Sep. 18, 2017.

"3rd Generation Partnership Project; Technical Specification Group Radio Access Network; Study on Further Enhancements to LTE Device to Devide (D2D), User Equipment (UE) to Network Relays for Internet of Things (Iot) and Wearables; (Release 15)," 3GPP TR 36.746, 3rd Generation Partnership Project (3GPP), Mobile Competence Center, vol. RAN WG2, No. V15.1.1, pp. 1-51, Apr. 15, 2018.

EP Application # 24181796.4 Search Report dated Sep. 4, 2024.

* cited by examiner

COLLABORATION AMONG WIRELESS DEVICES OPERATING OVER BOTH LONG-RANGE AND SHORT-RANGE NETWORKS

CROSS-REFERENCE TO RELATED APPLICATIONS

This application claims the benefit of U.S. Provisional Patent Application 62/790,032, filed Jan. 9, 2019, whose disclosure is incorporated herein by reference.

TECHNICAL FIELD

Embodiments described herein relate generally to wireless communication, and particularly to methods and systems for collaboration among wireless devices operating over both long-range and short-range networks.

BACKGROUND

Cellular networks typically provide long-range wireless communication by covering a large geographical area using multiple base stations. Example cellular communication systems comprise the 3GPP Long-Term Evolution (LTE) and the 5G communication systems. In short-range wireless communication, wireless devices communicate with one another over short distances, typically between several centimeters to several tens of meters. Short-range wireless communication systems comprise, for example, Bluetooth, Bluetooth Low Energy (BLE), Wi-Fi, and ZigBee (See below).

Some short-range communication networks operate over the Industrial, Scientific and Medical radio (ISM) bands, which require no license. The ISM bands include parts of the 2.4 GHz band and specific frequencies below 1 GHz. ISM regulations may differ among countries.

Aspects of the LTE MAC and PHY layers are described, for example, in 3GPP Technical Specification 36.321, entitled "Evolved Universal Terrestrial Radio Access (E-UTRA); Medium Access Control (MAC) protocol specification," (3GPP TS 36.321, version 15.7.0, Release 15), September 2019, and in in 3GPP Technical Specification 36.211, entitled "Evolved Universal Terrestrial Radio Access (E-UTRA); Physical channels and modulation," (3GPP TS 36.211, version 15.7.0, Release 15), March 2019.

Bluetooth is a wireless technology standard used for exchanging data between wireless devices over short distances and for creating Wireless Personal Area Networks (WPANs). Bluetooth is specified, for example, in "Bluetooth Core Specification," v5.1, Jan. 21, 2019.

ZigBee is an IEEE 802.15.4-based standard applicable in Personal Area Networks (PANS) supporting low-power low-bandwidth applications, such as home automation, medical device and data collection.

SUMMARY

An embodiment that is described herein provides a communication device that includes a long-rage transceiver, a short-range transceiver and a processor. The long-range transceiver is configured to communicate wirelessly with a Base Station (BS) of a cellular network. The short-range transceiver is configured to communicate wirelessly with one or more peer communication devices over a short-range network. The processor s configured to communicate with the peer communication devices via the short-range transceiver and with the BS via the long-range transceiver, so as to share resources between the communication device and the peer communication devices or the cellular network, for providing a communication service.

In some embodiments, the processor is configured to receive from a peer communication device, via the short-range transceiver, a signal that conveys data bits and that underwent partial or complete transmit processing by the long-range transceiver of the peer communication device for transmission to the BS, to complete processing the signal, by the LR transceiver, for producing a transmission signal that carries the data bits, and to transmit the transmission signal to the BS, on behalf of the peer communication device. In other embodiments, the processor is configured to communicate via the short-range transceiver with the peer communication devices in mutually selecting one or more gateway devices for jointly mediating communication of messages between the BS via the long-range transceiver and peer communication devices via the short-range transceiver. In yet other embodiments, the processor is configured to select the gateway devices, mutually with the peer communication devices, based on a criterion selected from a criteria list including—channel conditions with the BS, battery level or an amount of time left before the battery drains, connectivity costs to the long-range network, level of connectivity performance offered by Mobile Virtual Network Operator (MVNO), number of routing hops in the SR network, application considerations and device capabilities.

In an embodiment, the communication device and the peer communication devices include respective Secure Elements (SEs), and the processor is configured to establish secure communication with the peer communication devices over the short-range network, using the SEs. In another embodiment, the processor is configured to receive from a peer communication device, via the short-range transceiver using secure communication, one or more identities and one or more keys used by the peer communication device to access the cellular network, and to access the cellular network using the received identities and keys, on behalf of the peer communication device. In yet another embodiment, the processor is configured to receive a downlink message from the BS via the long-range transceiver, and to transmit the downlink message, via the short-range transceiver, to a peer communication device.

In some embodiments, the long-range transceiver is configured to wake up periodically from Idle mode, and during a wakeup period the processor is configured to receive, via the long-range transceiver, a control message sent by the BS, to produce measurements related to channel quality and to neighbor cells, and to send the control message and the measurements to a peer communication device via the short-range transceiver. In other embodiments, the long-range transceiver is configured to wake up periodically for detecting, on behalf of a peer communication device that remains in an Idle mode, paging messages destined to the peer communication device, to detect, during a wakeup period, a paging message destined by the BS to the peer communication device, and to send the paging message to the processor, and the processor is configured to transmit the paging message to the peer communication device via the short-range transceiver. In yet other embodiments, the processor is configured to receive from a peer communication device, via the short-range transceiver, information regarding time gaps during which no wireless communication occurs over the cellular network, and to communicate with the peer communication devices via the short-range transceiver during the time gaps.

In an embodiment, the processor is configured to synchronize to a time base of the cellular network, to which a peer communication device also synchronizes, and to perform synchronized discovery between the communication device and the peer communication device, in accordance with the time base. In another embodiment, the processor is configured to measure a local physical attribute, and to share the measured physical attribute with one or more peer communication devices via the short-range transceiver. In yet another embodiment, the processor is configured to receive from one or more peer communication devices respective attributes measured locally, to derive from the one or more attributes a common attribute, and to report the common attribute to a server coupled to the BS, via the long-range transceiver.

In some embodiments, the communication device belongs to a group including one or more communication devices that receive from the BS different respective parts of a firmware image, or an entire firmware image, destined to a target communication device, and the processor is configured to receive a respective part of the firmware image or the entire firmware image from the BS, and to send the received part or the entire firmware image to the target communication device over the short-range network. In other embodiments, the processor is configured to communicate messages with the BS via the long-range transceiver on behalf of one or more peer communication devices that are un-activated or not on-boarded in the cellular network.

There is additionally provided, in accordance with an embodiment that is described herein, a method for communication including, in a communication device that includes a long-range transceiver for wireless communication with a Base Station (BS) of a cellular network, and further includes a short-range transceiver for wireless communication with one or more peer communication devices over a short-range network, communicating with the peer communication devices via the short-range transceiver and with the BS via the long-range transceiver, so as to share resources between the communication device and the peer communication devices or the cellular network, for providing a communication service.

These and other embodiments will be more fully understood from the following detailed description of the embodiments thereof, taken together with the drawings in which:

DETAILED DESCRIPTION OF EMBODIMENTS

Overview

Figure 1:
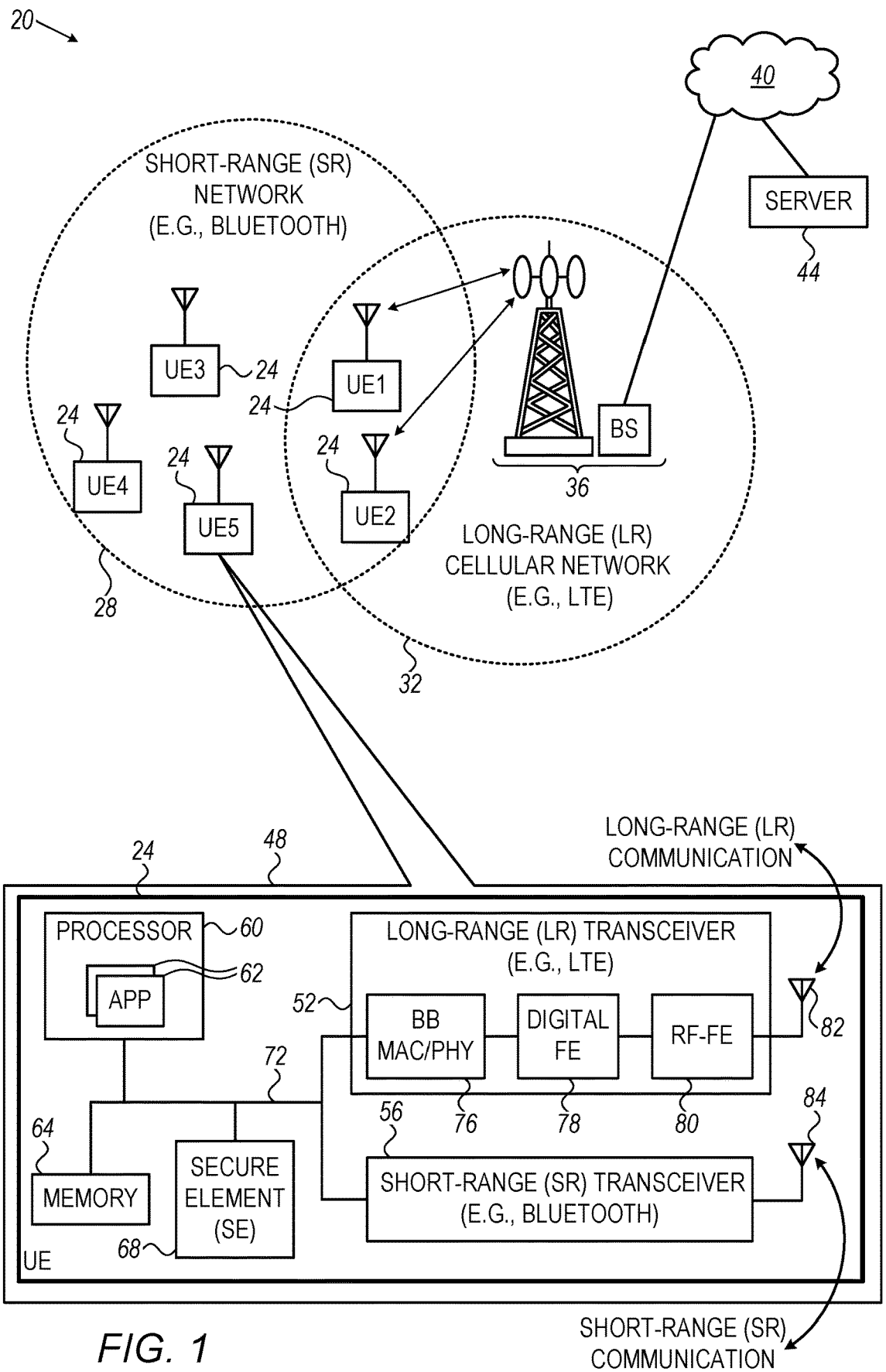
FIG. 1 is a block diagram that schematically illustrates a communication system in which wireless devices collaborate over a Short-Range (SR) network in communicating over a Long-Range (LR) network, in accordance with an embodiment that is described herein.

Embodiments that are described herein provide methods and systems for collaboration and resource sharing among wireless devices that operate over both long-range and short-range networks.

In the described embodiments, wireless devices are equipped with a long-range transceiver for communication in accordance with a long-range cellular network standard, e.g., LTE, and a short-range transceiver for communication in accordance with a short-range network standard, e.g., Bluetooth, Wi-Fi or ZigBee.

In principle, wireless devices may communicate over the long-range networks independently of other neighbor wireless devices. As will be described in detail below, however, by collaborating over the short-range network, wireless devices may share resources to improve performance in various aspects such as coverage of the cellular network, battery usage of the wireless devices, utilization of the cellular network and reducing communication costs. Example embodiments in which multiple wireless devices collaborate and share resources are described below.

In some embodiments, multiple wireless devices collaborate over the short-range network for sharing transceiver resources in uplink and downlink transmissions. In these embodiments, a wireless device uses the long-range transceiver(s) resources of one or more peer wireless devices. The peer wireless devices serve as gateway devices that transmit data to and receive data from the cellular network, on behalf of the wireless device. This may be useful, for example, when the wireless device has poor quality channel with the BS or is unable to connect to the cellular network, for reducing power consumption of the wireless device, e.g., due to a low battery level, or for reducing communication costs.

In the uplink direction, the wireless device sends a plurality of bits and metadata specifying long-range transceiver parameters for transmitting the bits to a gateway device, over the short-range network. The gateway device transmits the bits to the cellular network, on behalf of the wireless device, by injecting the bits to its long-range transceiver and applying the parameters in the metadata. In another embodiment, a baseband module of the long-range transceiver of the wireless device processes the plurality of bits to produce modulated bits. The wireless device sends the modulated bits to the gateway device over the short-range network, and the gateway device injects the modulated bits to a relevant point in the processing chain of its long-range transceiver for transmission to the cellular network, on behalf of the wireless device.

In some embodiments, baseband processing may be divided between the wireless device and the gateway device in any suitable way. In such embodiments, the wireless device processes the input bits up to a certain point within the baseband processing chain and sends the processed bits to the gateway device over the short-range network. The gateway device completes the baseband processing to produce symbols corresponding to the bits and transmits the symbols to the cellular network. The elements of the cellular network are unaware of dividing baseband and other long-range processing between the wireless device and the gateway device.

In the downlink direction, one or more peer wireless devices serving as gateway devices, simultaneously receive from the cellular network, a downlink message destined to the wireless device. Each gateway device then decodes the received downlink message, e.g., based on metadata specifying the decoding required, which is provided by the wireless device beforehand, and transmits the decoded message to the wireless device over the short-range network. The wireless device combines the decoded messages to recover the downlink message with high reliability. In an alternative embodiment, the gateway device transmits the downlink message to the wireless device without decoding.

In some embodiments, reception of data via a gateway device, is used in updating firmware image of multiple wireless devices. The task of firmware update typically consumes significant amount of power, consumes large amounts of the cellular network resources, and has high communication costs. In these embodiments, the gateway device receives from the cellular network an updated firmware image, and distributes the firmware image to peer wireless devices, over the short-range network, thus saving battery power consumption in the peer wireless devices. In some embodiments, multiple gateway devices download different parts of the firmware image. The gateway devices exchange the parts of the firmware image to recover the complete firmware image, and send the recovered firmware image, over the short-range network, to the wireless device. Alternatively, the gateway devices send the parts of the firmware image, over the short-range network to the wireless device, which recovers the firmware image from the firmware image parts.

In some embodiments, a wireless device communicates with the cellular network uplink and downlink messages via multiple gateway devices, which improves performance by (i) increasing the overall transmission power, and (ii) increasing antenna diversity.

In some embodiments, a group of multiple wireless devices communicate over the short-range network to mutually select one or more gateway devices. Selecting a gateway device may depend on various criteria, such as, for example, channel quality with the BS, battery level, communication costs over the cellular network, application considerations, and the like. Application considerations means that a wireless device that has data for transmission may collaborate with other wireless devices to transmit their data as well. For example, a gateway device may aggregate for transmission multiple packets received over the short-range network from one or more peer wireless devices, to reduce number of packet headers transmitted and overhead due to connection establishment to the LR network.

In some embodiments, multiple wireless devices communicate over the short-range network for performing mutual authentication and for establishing secure short-range communication. To this end, the wireless devices comprise respective secure elements that each confidentially stores root-of-trust short-range keys for securing short-range communication, in addition to root-of-trust long-range keys required for accessing the long-range network. The wireless devices may communicate over the secure short-range network to securely exchange data and control messages. In some embodiments, a wireless device shares one or more of its identities and one or more long-range keys with peer wireless devices, over the secure short-range network. The peer wireless devices access the cellular network, on behalf of the wireless device, using the identities and long-range keys that were shared.

In an embodiment, multiple wireless devices perform collaborative paging. In this embodiment, one or more peer wireless devices listen to paging messages destined to another wireless device that remains in Idle mode to reduce battery power. The peer wireless devices wake up periodically, and upon detecting a paging message destined to the other wireless device, send the paging message to the wireless device, over the short-range network. In some embodiments, upon waking up, the peer wireless devices perform channel quality measurements, neighbor cell measurements, broadcast messages reception and cell (re)selection tasks on behalf of the other wireless device. The peer wireless devices transmit to the other wireless device, over the short-range network, updated information related to the tasks described above.

In some embodiments, two or more wireless devices synchronize to a time base of the cellular network (e.g., in LTE to the System Frame Number—SFN). In an embodiment, wireless devices use the common time base to determine time periods to be used in synchronized neighbor discovery. In this embodiment, in accordance with the time base, one wireless device transmits beacon signals at determined time slots, and another wireless device scans for beacon signals during the same time periods, thus reducing power consumption and discovery latency.

In some embodiments, multiple wireless devices collaborate to reduce interference caused by simultaneous communication over both the short-range network and the cellular network. In these embodiments, information of time gaps in which no communication is expected over the cellular network is distributed over the short-range network among the wireless devices. The wireless devices then restrict transmission over the short-range network to the reported time gaps. In another embodiment, a wireless device is notified (or guesses) that a gateway device is unable to communicate over the short-range network (due to long-range transmission) and enters a low-power "listening" mode. The gateway device uses Idle periods within the long-range transmission to communicate with the wireless device over the short-range network.

In some embodiments, one or more wireless devices are configured to determine their respective geographical locations, and possibly other environmental physical information such as temperature and humidity. In these embodiments, a group of wireless devices mutually select, over the short-range network, one or more wireless devices for acquiring location information and environmental attributes, on behalf of the entire group. The selected wireless devices acquire location information and environmental attributes and share them, over the short-range network, with other wireless devices in the group. One or more wireless devices in the group may report the location information and the environmental attributes to a remote server over the cellular network. In some embodiments, the selected wireless devices share the location information and environmental attributes among themselves to be combined for increasing estimation accuracy.

In the disclosed techniques, wireless devices collaborate for sharing hardware resources and cellular network resources, with no explicit coordination with elements of the cellular network. Moreover, the collaboration among the wireless devices occurs automatically without involving the end-users of the wireless devices. Collaboration and resource sharing are advantageous in terms of cellular network coverage and utilization, battery power and lifetime, reduced interference between radio networks, short-range device discovery latency, communication costs and improved acquired metrics such as location and environmental attributes.

System Description

FIG. 1 is a block diagram that schematically illustrates a communication system 20 in which wireless devices collaborate over a Short-Range (SR) network in communicating over a Long-Range (LR) network, in accordance with an embodiment that is described herein.

In communication system 20, wireless devices 24 communicate with one another over a SR communication network 28, and with remote elements over a LR communication network 32. The SR network may operate, for example, in accordance with the Bluetooth, Wi-Fi or ZigBee standards. The LR network comprises a cellular communication network operating, for example, in accordance with the 3GPP Long Term Evolution (LTE) or the 5G standard. Wireless device 24 is also referred to as a "User Equipment" (UE), which is the term typically used in LTE for end-user devices. In the description that follows the terms "wireless device" and "UE" are used interchangeably.

In the example of FIG. 1, wireless devices 24 denoted UE1 . . . UE5 are assumed to be located within a small geographical area so that they can communicate with one another over the SR network. The coverage area of the SR network is depicted by dotted line 28. A communication link between two UEs over the SR network is also referred to herein as a "SR link" or "direct link."

Note that wireless devices 24 may communicate with other wireless devices over the SR network using any suitable connection method such as, for example, point-to-point, point to multipoint and hop-by-hop transmission. The short-range network may be configured in any suitable topology such as, for example, mesh, star and cluster tree topologies.

The LR network typically comprises multiple Base Stations (BSs) such as BS 36, which together cover a large geographical area. In the example of FIG. 1, UE1 and UE2 reside within the coverage area of BS 36 (depicted as dotted line 32) and therefore can access the cellular network via BS 36. In contrast, UE3 . . . UE5 reside outside the coverage area of BS 36 and therefore cannot access the cellular network directly via BS 36. As will be described in detail bellow, wireless devices such as UE3 . . . UE5 may access the cellular network indirectly using UE1 and/or UE2 serving as gateway devices toward the cellular network.

Communication system 20, further comprises a packet network 40 to which a server 44 and BS 36 are coupled. A wireless device within the coverage are of BS 36, e.g., UE1, may communicate with server 44 by communicating wirelessly with BS 36 and via packet network 40 with the server. Packet network 40 may comprise any suitable packet network operating using any suitable protocols, e.g., an Ethernet or IP network. In some embodiments, packet network 40 provides access to the Internet. In the description that follows it is generally assumed that packet network 40 comprises both the core network of the cellular network and the Internet.

Communication system 20 may be used in various applications. For example, wireless devices 24 may comprise low-cost devices such as Internet of Things (IoT) devices, which may be used in applications such as metering, logistics, smart home, traffic management, smart grid, and many other industrial and commercial applications.

Inset 48 in FIG. 1, depicts a block diagram of an example internal structure of wireless device (UE) 24. In the present example, wireless device 24 comprises a Long-Range (LR) transceiver 52 for communicating with BS 36, and a Short-Range (SR) transceiver 56 for communicating over SR network 28 with other wireless devices 24 nearby.

Wireless device 24 further comprises a processor 60 running one or more software programs and/or application programs 62, a memory 64 and a Secure Element (SE) 68. Processor 60 is coupled to memory 64, SE 68, LR transceiver 52 and SR transceiver 56 via any suitable bus or link 72. Alternatively, processor 60 may be coupled to LR transceiver 52 and to SR transceiver 56 using dedicated interfaces (not shown). Memory 64 typically stores information for processor 60 such as program code and temporary information used, for example, by application programs 62. In some embodiments, memory 64 additionally stores information for LR transceiver 52 and SR transceiver 56.

SE 68 handles various security tasks for wireless device 24. For example, SE 68 may store credential information and identification information required for accessing and being served by LR network 32. In some embodiments, SE 68 comprises a cryptographic engine (not shown), which processor 60 may use as a coprocessor for authenticating other UEs equipped with similar SEs, for encryption/decryption and key generation. In some embodiments, SE 68 comprises a processor (not shown) that securely runs sensitive applications. The processor of SE 68 may participate in establishing secure communication over the SR network. In some embodiments, SE 68 is embedded within a SIM card of wireless device 24. The functionality of the SIM card is required for accessing the LR network. In some embodiments a physical SIM card resides externally to SE 68 and provides SIM card functionality to SE 68. Alternatively, SE 68 is part of a System On a Chip (SOC) comprising at least processor 60 and memory 64. As will be described in detail below, SE 68 may be used for connectivity with both the LR network (i.e., SE 68 performs the functionality of a SIM card), and with the wireless devices over the SR network (dependent on authentication and security).

LR transceiver 52 comprises a Baseband (BB) module 76, a digital Front End (FE) 78 and a Radio Frequency-Front End (RF-FE) module 80 coupled to an antenna 82 (or multiple antennas 82). In some embodiments, BB 76 implements a Medium access control (MAC) layer and a Physical (PHY) layer. In an embodiment, BB 76 also implements higher layers (higher than the MAC and PHY layers) such as the "Radio Link Control" (RLC) layer or the "Radio Resource Control" (RRC) layer. Among other tasks, the MAC layer controls the access to the physical transmission medium, for efficient utilization of time and frequency recourses of the LR network. The PHY layer typically handles error correction encoding/decoding, modulation/demodulation between bits and symbols, signal equalization and synchronization at the receiver, and the like.

In the uplink direction, BB 76 receives bits for transmission from processor 60 via bus 72. BB 76 processes and modulates the bits to produce respective symbols in accordance with some modulation scheme. Digital FE 78 translates the modulated symbols into a sampled time signal, and filters and shapes the time signal for transmission. A Digital to Analog Converter (DAC—not shown) converts the time signal to an analog signal. The DAC may be comprised in an Analog Front End (AFE) module between the digital FE and the RF-FE.

RF-FE 80 may be implemented using separate RF and FE modules. The RF modules up-converts the analog signal to a relevant RF band specified for the LR network, and amplifies the up-converted signal (e.g., using a power amplifier—not shown). The FE module interfaces the amplified signal for transmission to BS 36 via antenna 82. In the downlink direction, the FE module RF-FE 80 receives via antenna 82 a RF signal from BS 36, and interfaces the RF signal to RF module. The RF module amplifies the RE signal, e.g., using a Low Noise Amplifier (LNA) (not shown) and down-converts the RF signal to baseband. The received RF signal carries bits modulated into symbols. An Analog to Digital Converter (ADC—not shown) converts the down-converted signal to a digital sampled signal and digital FE 78 filters the digital signal and recovers the symbols. BB 76 demodulates the symbols in accordance with the underlying modulation scheme to recover the bits, applies error correction decoding techniques to correct erroneous bits in the received message, and sends the decoded message to processor 60 via bus 72.

SR transceiver 56 operates in accordance with the underlying SR network standard, e.g., Bluetooth. In a transmission direction, SR transceiver 56 receives bits for transmission from processor 60 via bus 72, processes the bits in the digital and analog domains to produce a RF signal that carries the bits, and transmits the RF signal via antenna 84. In a reception direction, SR transceiver 56 receives via antenna 84 a RF signal that was transmitted by a SR transceiver of a neighbor wireless device. SR transceiver 56 processes the received RF signal in the analog and digital domains to recover bits transmitted by the neighbor wireless device and sends the recovered bits to processor 60 via bus 72. In an embodiment, the recovered bits may be sent directly to long range transceiver (52).

The configurations of communication system 20, including SR network 28, LR network 32 and wireless device 24 of FIG. 1 are given by way of example, which are chosen purely for the sake of conceptual clarity. In alternative embodiments, other suitable communication system, SR network, LR network and wireless device configurations can also be used.

The division of functions among processor 60 and digital parts of LR transceiver 52 and SR transceiver 56 may differ from the division shown in FIG. 1. For example, processor 60 may implement at least part of BB 76, digital FE 78 and/or a digital part of SR transceiver 56.

Some elements of wireless device 24, such as processor 60, SR transceiver 56, and LR transceiver 52 including BB 76, digital FE 78, and RF-FE 80, may be implemented in hardware, e.g., in one or more RFICs, Application-Specific Integrated Circuits (ASICs) or Field-Programmable Gate Arrays (FPGAs). Additionally or alternatively, some elements of wireless device 24 can be implemented using software, or using a combination of hardware and software elements.

In the example wireless device configuration shown in FIG. 1, processor 60, memory 64, SE 68, LR transceiver 52 and SR transceiver 56 are implemented as separate Integrated Circuits (ICs). In alternative embodiments, however, processor 60, memory 64, SE 68, LR transceiver 52 and SR transceiver 56 may be integrated on separate semiconductor dies in a single Multi-Chip Package (MCP) or System on Chip (SoC), and may be interconnected by an internal bus (72). Alternatively, other distributions of processor 60, memory 64, SE 68, LR transceiver 52 and SR transceiver 56 into ICs can also be used.

In some embodiments, some of the functions of wireless device 24 may be carried out by a general-purpose processor, e.g., processor 60, a processor implementing a digital part of LR transceiver 52 such as BE 76 and part of digital FE 78, and/or a processor implementing a digital part of SR transceiver 56, the processor is programmed in software to carry out the functions described herein. The software may be downloaded to the relevant processor in electronic form, over a network, for example, or it may, alternatively or additionally, be provided and/or stored on non-transitory tangible media, such as magnetic, optical, or electronic memory.

Memory 64 may comprise any suitable type of memory, such as, for example, a volatile memory such as a Random Access Memory (RAM), a nonvolatile storage such as a Flash memory, or a combination of two or more memory devices of different respective technologies.

Elements that are not necessary for understanding the principles of the present disclosure, such as various interfaces, addressing circuits, timing and sequencing circuits and debugging circuits, have been omitted from the figure for clarity.

Figure 2:
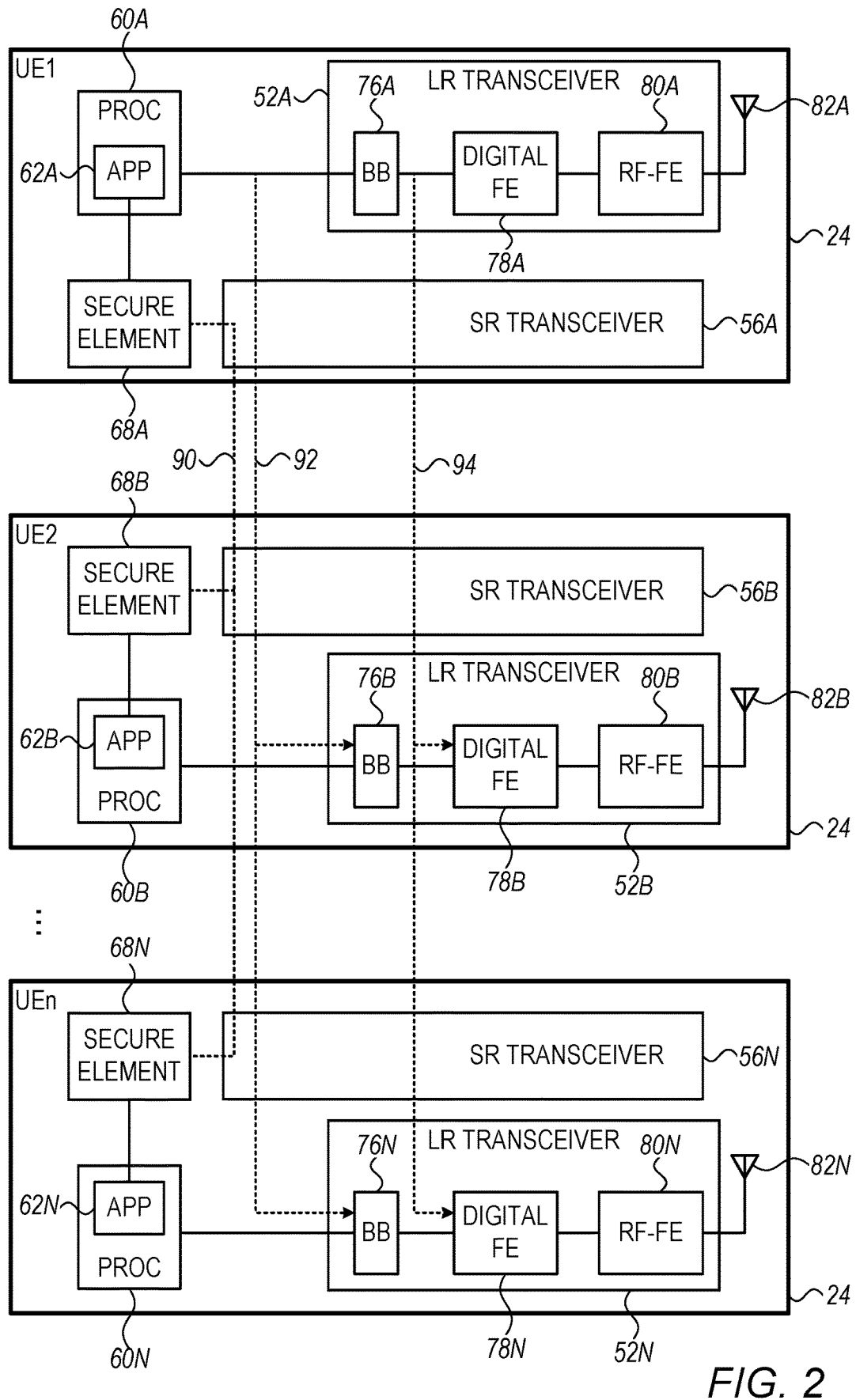
FIG. 2 is a diagram that schematically illustrates wireless devices collaborating over a SR network, for sharing LR transceiver resources in accessing a LR network, in accordance embodiments that are described herein.

Accessing Long-Range Network Via Transceivers of Peer Wireless Devices Over Short-Range Network FIG. 2 is a diagram that schematically illustrates wireless devices 24 collaborating over SR network 28, for sharing LR transceiver resources in accessing LR network 32, in accordance embodiments that are described herein.

In FIG. 2, multiple wireless devices 24 denoted UE2 . . . UEn share LR transceiver resources with another wireless device denoted UE1. It is assumed that UE1 . . . UEn reside within a small geographical area so that they can communicate with one another over SR network 28. In the example of FIG. 2, UE1 can communicate directly with any of UE2 . . . UEn over the SR network (as opposed to multi-hop communication).

In the embodiments that will be described below, communication of the UE over the SR network is carried out by processor 60. This, however, is not mandatory, and in alternative embodiments, other elements of the UE may handle SR communication. For example, each BB 76 may comprise a processor that among other tasks handles SR communication. In the present context and in the claims, the term "processor" refers to processor 60 that handles SR communication, to a processor within BB 76 that handles SR communication, or any suitable division of the SR communication between processor 60 and a processor within BB 76.

In the present example, UE1 is required to transmit to BS 36 a plurality of bits. The plurality of bits may comprise a packet or any other suitable data unit. The bits may originate, for example, by an application program 62A running on processor 60A of UE1. In some embodiments, instead of transmitting the packet bits via its own LR transceiver 52A, UE1 sends the packet bits over the SR network for transmission via a LR transceiver of another wireless device (or multiple LR transceiver of respective wireless devices) among UE2 . . . UEn.

In some embodiments, processors 60 of different respective UEs communicate with one another over SR network 28. For example, processor 60A of UE1 may communicate using SR transceiver 56A with processor 60B of UE2 via SR transceiver 56B of UE2, and with processor 60N of UEn via SR transceiver 56N of UEn.

Dotted lines 90, 92 and 94 in FIG. 2 represent logical paths that UE1 . . . UEn may use in exchanging information over the SR network, as described herein.

Dotted line 90 represents secure communication among UE1 . . . UEn over SR network 28. In some embodiments, processors 60A . . . 60N of respective wireless devices UE1 . . . UEn may establish mutual secure communication over the SR network using respective SEs 68A . . . 68N, by applying any suitable methods and protocols. In other embodiments, the processor of one UE, e.g., processor 60A of UE1 establishes secure communication over the SR network, with one or more processors 60 of the other wireless devices (e.g., processors 60B . . . 60N of UE2 . . . UEn) using their respective SEs 68B . . . 68N.

Dotted line 92 represents a path that processor 60A of UE1 may use for sending information such as the packet bits, over the SR network, for transmission using one or more LR transceivers 52B . . . 52N of respective wireless devices UE2 . . . UEn. In such embodiments, a processor among processors 60B . . . 60N of peer wireless devices UE2 . . . UEn receives the packet bits from UE1 over the SR network, e.g., processor 60B of UE2, and transmits the packet bits to BS 36, on behalf of UE1 by injecting the packet bits to BB 76B of LR transceiver 52B. In an embodiment, processor 60A of UE1 sends over the SR network, along with the packet bits, metadata that specifies setup parameters that LR transceiver of the peer UE should use in transmitting the packet bits of UE1. The metadata comprises information such as, Modulation and Coding Scheme (MCS), frequency, timing and/or any other suitable information required for transmitting the packet bits using the LR transceiver of the peer UE.

Dotted line 94 represents a path that processor 60A of UE1 may use for sending modulated bits (e.g., symbols produced by BB 76A from the packet bits) over the SR network, for transmission using one or more of LR transceivers 52B . . . 52N of respective peer wireless devices UE2 . . . UEn. In such embodiments, a processor among processors 60B . . . 60N of peer wireless devices UE2 . . . UEn receives the modulated bits from UE1, e.g., processor 60B of UE2, and transmits the modulated bits to BS 36, on behalf of UE1 by injecting the modulated bits to digital FE 78B of LR transceiver 52B of UE2. In this case, BB 76A of UE1 produces the modulated bits, and the processing in BB 76B of the peer UE2 is skipped. UE1 may send over the SR network metadata specifying parameters such as transmission time, frequency and gain to apply in the SR transceiver of the peer UE.

When UE1 is connected to the cellular network via BS 36, BB 76A receives from BS 36 information specifying transmission parameters. In this case, processor 60A of UE1 may send the packet bits with relevant metadata, to the peer wireless devices UE2 . . . UEn (which are not identified to the LR network), over SR network 28, Alternatively, BB 76A of UE1 produces the modulated bits, and processor 60A sends the modulated bits to the peer UEs, over the SR network. Since UE1 is identified to the cellular network, BS 36 is unaware of receiving the packet bits (or modulated bits) of UE1 via the LR transceiver of a peer UE.

In some embodiments, processor 60A of UE1 shares confidential information (which relates to the LR network) with the processor of a peer UE, over secure SR network 28, e.g., with processor 60B of UE2. In an embodiment, the peer UE uses the confidential information of UE1 for connecting to BS 36 on behalf of UE1. For example, when UE1 has connection to the BS, it may send temporary identities and keys (e.g., Key Access Security Management Entries (KASME) and TMSI in LTE) to a peer UE over secure SR network 28. The temporary keys are typically derived by a key derivation process originated by a SIM card of UE1. Alternatively, when UE1 has no connection to the cellular network via BS 36, upon request from another wireless device, e.g., UE2, UE1 may generate the keys for the peer UE and send them over the over secure SR network 28. In this embodiment, the peer UE identifies to the cellular network, on behalf of UE1.

Similarly to the BS being unaware of sharing transceiver resources, here too, the BS is unaware of a peer UE being identified to the cellular network on behalf of UE1.

In an embodiment, UE2 connects to BS 36 on behalf of UE1 using UE1's identities and keys. In this embodiment, processor 60A of UE1 transmits the packet bits to processor 60B of UE2 over secure SR network 28, and processor 60B of UE2 transmits the packet bits, on behalf of UE1, to BS 36 over LR network 32. In this case, BS 36 is unaware of UE2 connecting to the cellular network on behalf of UE1, using the identities of UE1.

In the example of FIG. 2, UE1 sends packet bits or modulated bits produced by BB 76A to other UEs for transmission. In alternative embodiments, baseband processing may be divided between the BB modules of UE1 and UE2, for example. In this case, BB 76A of UE1 produces a signal that conveys packet bits by performing partial baseband-processing to the packet bits, up to a certain stage before producing the symbols. UE2 receives the signal from UE1 over the SR network, completes the BB processing (using BB 76B) to produce the symbols, generates a transmission signal from the symbols, and transmits the transmission signal to the BS on behalf of UE1.

Embodiments in which a UE accesses the cellular network using LR transceiver resources of one or more other UEs may be advantageous in various scenarios. For example, the communication quality of UE1 with BS 36 may be poor compared to peer wireless devices UE2 . . . UEn, or UE1 may fail to connect to the cellular network. As another example, when the battery level of UE1 is low, UE may reduce its power consumption by communicating over the LR network using transceiver resources of other UEs. As yet another example, UE1 may use transceiver resources of other UEs for saving communication costs (e.g., when UE1 is activated at the LR network operator but remains not on-boarded, or UE is not activated at the LR network operator).

Figure 3:
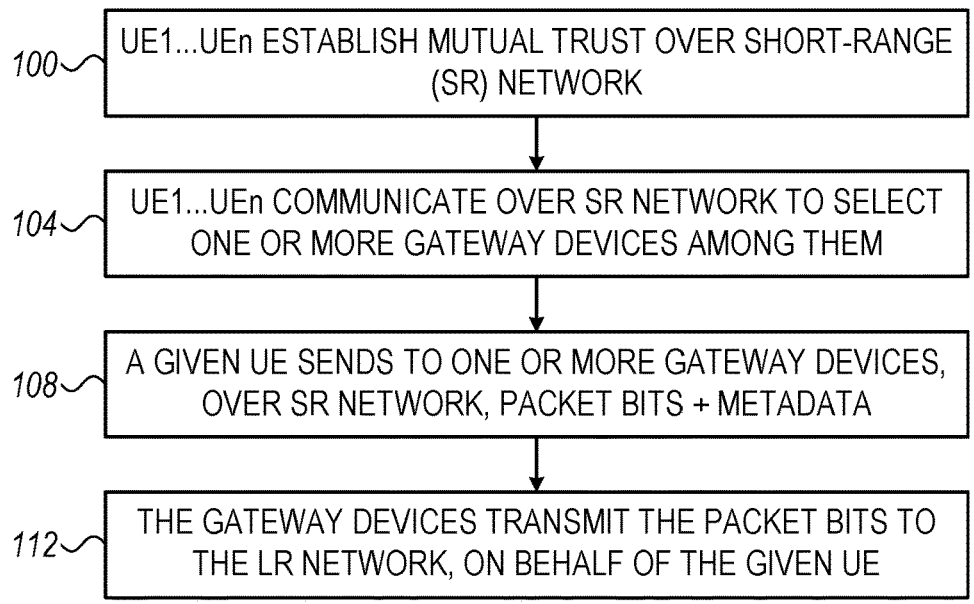
FIG. 3 is a flow chart that schematically illustrates a method for sharing LR transceiver resources in uplink transmissions, in accordance with an embodiment that is described herein.

FIG. 3 is a flow chart that schematically illustrates a method for sharing LR transceiver resources in uplink transmissions, in accordance with an embodiment that is described herein.

The method begins with multiple wireless devices 24 denoted UE1 . . . UEn establishing mutual trust communication over SR network 28, at a secure communication establishment step 100. To this end, in some embodiments, SE 68 of each UE1 . . . UEn holds confidential information referred to herein as "root-of-trust," or "root key." SE 68 typically stores short-range keys for securing SR communication and separate long-range keys for accessing the LR network. Processors 60A . . . 60N of respective wireless devices UE1 . . . UEn communicate with one another, over the initially unsecure SR network 28, messages in accordance with any suitable protocol, to establish the mutual trust based on the short-range keys. When step 100 concludes, UE1 . . . UEn may communicate securely with one another over SR network 28, which is now considered as a secure SR network. From the perspective of a given wireless device among UE1 . . . UEn, the processor of the wireless device is configured to establish secure communication with peer wireless devices over the SR network, using the SEs of the respective wireless devices.

At a gateway selection step 104, UE1 . . . UEn communicate over the secure SR network, for mutually selecting one or more UEs among UE1 . . . UEn that will serve as gateway devices toward the LR network via BS 36. From the perspective of a given UE among UE1 . . . UEn, the processor of the given UE is configured to communicate, via its SR transceiver, with peer UEs for mutually selecting the given UE or a peer UE to serve as a gateway device toward the cellular network. The process of selecting gateway devices may be carried out occasionally, e.g., per each uplink transmission, once per multiple uplink transmissions, or at any other suitable time occasions.

In the present context, the term "gateway device" refers to a wireless device (e.g., a UE) that communicates over the LR network and that provides access to the LR network for other wireless devices communicating with the gateway device over the SR network. Example embodiments for selecting gateway devices will be described below.

At a transmission to gateway step 108, a given UE (typically not one of the gateway devices) sends to one or more gateway devices selected at step 104, over the secure SR network, packet bits for transmission to the LR network and metadata specifying relevant parameters in the LR transceiver setup, as described above with reference to FIG. 2.

At a transmission step 112, gateway devices that receive the packet bits and metadata over the SR network, determine, based on the metadata, a suitable transmission time, and transmit the packet bits to the LR network, on behalf of the given UE, by applying the setup parameters contained in the metadata to the respective LR transceivers 52. Following step 112, the method terminates.

At step 104 above, UE1 . . . UEn may select a gateway device using any suitable criteria. Example selection criteria that can be used individually or in combination are listed herein:

Select a gateway device among multiple UEs in a deterministic order, e.g., using a round-robin method or any suitable predefined order.

Battery level—a UE whose battery level is high or a UE whose battery is being charged is a good candidate for serving as a gateway device.

Coverage conditions—gateway device selection is based on criteria related to communication quality with the BS. Example such criteria comprise: Received Signal Strength Indicator (RSSI), Reference Signal Received Power (RSRP), Signal to Interference plus Noise Ratio (SINR), Channel Quality Indicator (CQI), or any other suitable indicator of the BS channel quality.

Data connectivity plans—select a gateway device based on connectivity costs to the LR network.

Mobile (Virtual) Network Operator M(V)NO—select a gateway device engaged with a network operator that provides a higher level of connectivity performance than other network operators (e.g., the network configuration of the selected network operator allows high quality communication).

SR network routing considerations—select the gateway device based on the number of hops to the destination wireless device over SR links. Note that reselecting a gateway may be required, e.g., in response to a modification in the SR links between the wireless devices.

Device capabilities—select a gateway device based on the processing power and/or memory constraints among candidate gateway devices.

In some embodiments, a remote server (e.g., server 44) participates in selecting gateway devices using the criteria above.

Using the method of FIG. 3, a given UE may transmit data to the LR network via one gateway device, or via multiple gateway device simultaneously. Transmitting the same data via multiple gateway devices improves reception quality at the receiver side (e.g., a receiver in BS 36), because the overall transmission power increases, and due to antenna diversity.

In embodiments in which multiple gateway devices are selected for uplink transmissions of another UE, techniques such as Cyclic Delay Diversity (CDD), sometimes used in Multiple-In Multiple-Out (MIMO) communication, can also be used. When using CCD, BS 36 may not be aware of receiving transmissions from multiple gateway devices, which requires no modifications to the underlying standards.

In the downlink direction, in an embodiment, one or more gateway devices receive from the LR network via BS 36, a message destined to a given UE, and send the message to the given UE over the SR network, as will be described in detail below.

Figure 4:
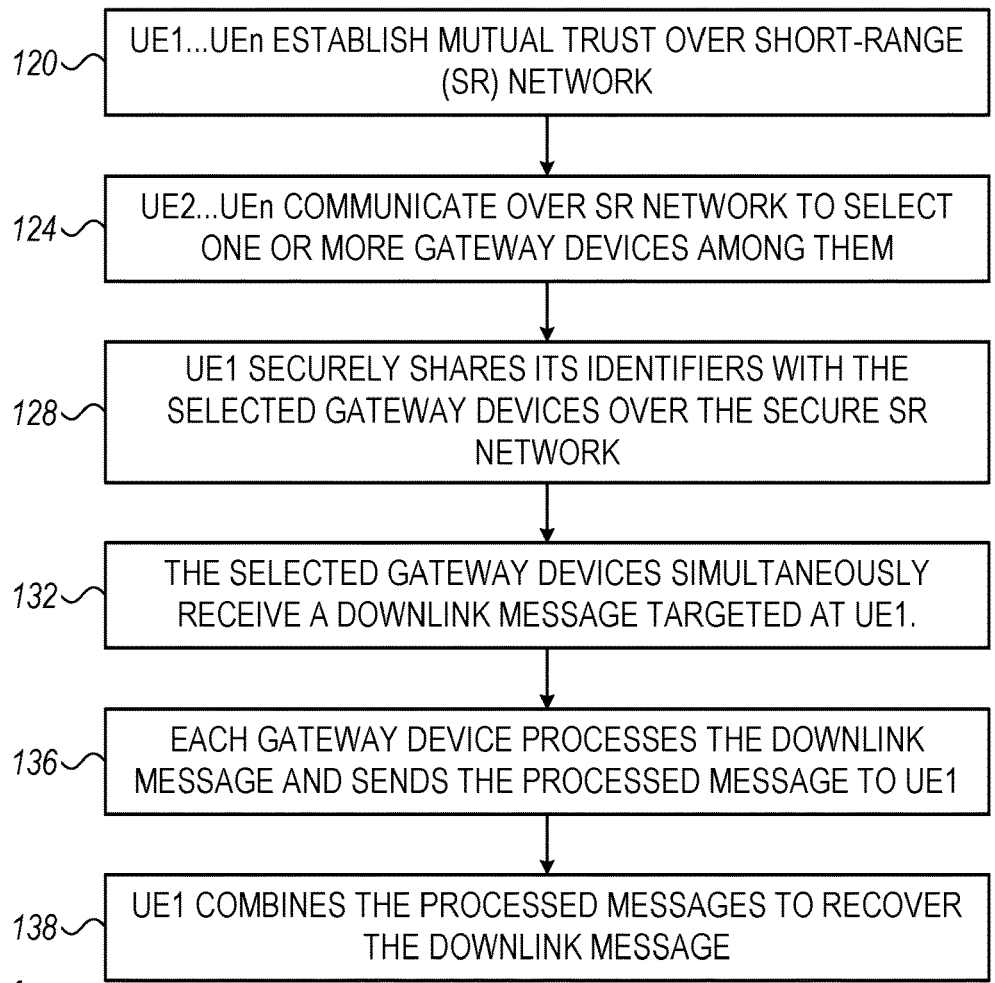
FIG. 4 is a flow chart that schematically illustrates a method for sharing LR transceiver resources in downlink transmissions, in accordance with an embodiment that is describe herein.

FIG. 4 is a flow chart that schematically illustrates a method for sharing LR transceiver resources in downlink transmissions, in accordance with an embodiment that is describe herein.

The method begins with UE1 . . . UEn establishing mutual trust communication over SR network 28, at a secure communication establishment step 120. Step 120 is essentially similar to step 100 of FIG. 3 above.

At a gateway selection step 124, UE2 . . . UEn mutually select, by communicating over the secure SR network, one or more UEs among UE2 . . . UEn to serve as gateway devices for UE1. In some embodiments, step 124 may be similar to step 104 of FIG. 3 above. At an identifier sharing step 128, UE1 securely shares one or more of its identities and one or more keys (required for accessing the LR network) with the selected gateway devices over the secure SR network. The gateway devices use the identifiers of UE1 for decoding LR network control messages destined from the BS to UE1. For example, in LTE, such identifiers may comprise, among others, the temporary identity—Temporary Mobile Subscriber Identity (TMSI), and the temporary key (KASME—Key Access Security Management Entries). In some embodiments that will be described below, control messages sent by the BS may comprise, for example, paging messages, and system information broadcast messages.

At a reception step 132, the selected gateway devices simultaneously receive from BS 36 a downlink message targeted at UE1. At a message decoding step 136, each (or some) of the gateway devices locally processes the downlink message using the identifiers of UE1 and sends the processed message over the secure SR network to UE1. In some embodiments, UE1 provides to the gateway devices, over the SR network, metadata specifying the required processing of the downlink messages. At a message combining step 138, UE1 combines the processed messages received from the gateway devices to recover the downlink message. UE1 may combine the processed messages using any suitable method that reduces the probability of an erroneous message. For example, UE1 may apply any soft combining or averaging method over multiple processed messages, or a bitwise majority vote across multiple processed messages. Following step 138 the method terminates.

In the method of FIG. 4, when multiple gateway devices are selected to relay a downlink message to UE1, the downlink message may be recovered with high reliability due to antenna diversity and the combining operation. From the perspective of a gateway device, the processor of that gateway device is configured to receive a downlink message from the BS via the LR transceiver, and to transmit the downlink message, via the SR transceiver, to a peer wireless device. In an alternative embodiment, the method of FIG. 4 may be performed with selecting a single gateway device for relaying a downlink message to UE1.

In some embodiments, each UE has a unique identity (different from the identity (or identities) used for accessing the LR network). This unique identity is embedded in messages (e.g., in a suitable header field) transferred from/to the server. A gateway device that is able to decode a message received over the LR network, reads the identity field in the message to verify whether the message is destined to itself or to another target UE, in which case the gateway device transmits the message to the target UE over the SR network.

Although in the method of FIGS. 3 and 4 uplink and downlink communication were described separately, in some implementations the gateway devices handle both uplink and downlink. In such embodiments, a given UE communicates over the SR network with peer UEs in mutually selecting one or more gateway devices for jointly mediating communication of messages between the BS over the LR network and peer communication devices over the SR network.

Sharing Resources in LR Network Paging and Cell Measurements

In some cellular networks such as LTE networks, in order to reduce power consumption, wireless devices enter a sleep or Idle mode and periodically wake up to check for paging messages coming from the BS. In some embodiments, a wireless device wakes up periodically at time periods depending on its identity. For example, in LTE, wakeup time slots depend on the International Mobile Subscriber Identity (IMSI) of the wireless device or on the Temporary Mobile Subscriber Identity (TMSI), which is temporarily assigned to the wireless device by the cellular network. The periodic wakeup functionality is typically implemented by the "Radio Resource Control" (RRC) layer processing within BB 76 of LR transceiver 52. In LTE, the sleep mode is determined by the RRC layer, which determines Idle mode parameters. The sleep mode is also referred to as "Discontinuous Reception" (DRX).

Since wireless devices typically consume much more power during wakeup periods compared to the sleep mode, it would be advantages to wake up a wireless device only when the cellular network actually receiving a paging message destined to that wireless device. In some embodiments, to avoid unnecessary wakeup events, one or more UEs listen to paging messages on behalf of other UEs that remain in sleep mode. In these embodiments, the UEs selected to listen to the paging channel report paging messages to the other UEs only when detecting paging messages destined to these UEs.

Figure 5:
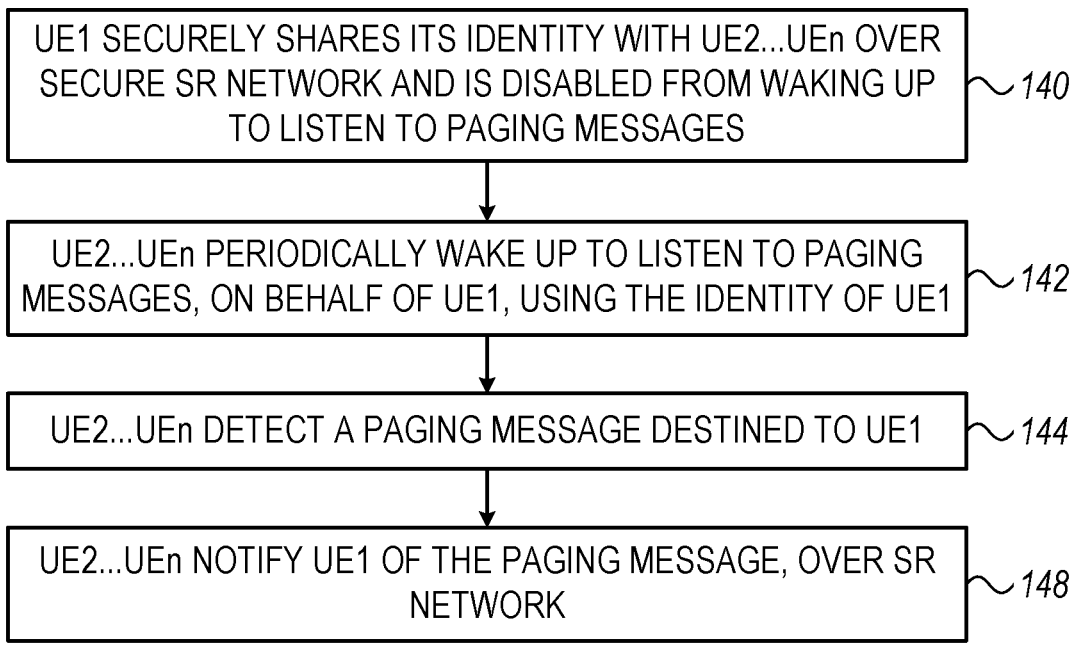
FIG. 5 is a flow chart that schematically illustrates a method for collaborative paging, in accordance with an embodiment that is described herein.

FIG. 5 is a flow chart that schematically illustrates a method for collaborative paging, in accordance with an embodiment that is described herein.

The method begins with UE1 securely sharing its identity (e.g., IMSI or TMSI in LTE) with peer wireless devices UE2 . . . UEn over secure SR network, at an identity sharing step 140. Further at step 140, UE1 is disabled from waking up for checking for paging messages and remains in sleep mode. At a waking up step 132, UE2 . . . UEn wake up periodically for checking for paging messages destined to UE1. In an embodiment, the LR transceiver of UEs 24 implements the periodic wakeup function, e.g., as part of the PHY/MAC/RRC layer processing. In some embodiments, a wireless device among UE2 . . . UEn wakes up at time periods depending on its own identity, as well as at time periods depending on the identity of UE1.

At a paging reception step 144, UE2 . . . UEn wake up simultaneously (for UE1). In response to detecting by the LR transceivers of UE2 . . . UEn, during the wakeup period, a paging message destined to UE1, the LR transceivers send the paging message to their respective processors (60). At a paging notification step 148, processors 60 of respective wireless devices UE2 . . . UEn notify processor 60 of UE1 of the paging message, over SR network 28. The processor of UE1 receiving the paging messages wakes up the LR transceiver of UE1 to perform tasks required for that wakeup period as if it has woken up by itself. Following step 148, the method terminates. Note that similarly to receiving downlink messages as described above, the UEs may collaborate to improve reliability in receiving the paging messages using antenna diversity and combining methods.

In some embodiments, a server (e.g., server 44) is required to page a group of UEs simultaneously. In such embodiments, the server selects a subgroup of the UEs that will listen to paging messages on behalf of the entire group. UEs not belonging to the subgroup remain in sleep mode. A UE in the subgroup that wakes up periodically and detects a paging message, notifies the paging message to other UEs in the group.

In some embodiments, during a wakeup period, wireless device 24 may perform various measurements and possibly make decisions related to cell selection and reselection. The wireless device monitors the channel quality with BS 36, measures the transmission power of other neighboring cells, and performs a cell (re)selection procedure when certain conditions (defined by the network) are met. For example, decide on cell reselection when the signal strength of a neighbor BS is higher than that of the serving cell by a predefined number of dB units.

In cell reselection, the wireless device typically receives from a candidate neighbor cell broadcasted information, e.g., Master Information Block (NIB) and System Information Block (SIB) messages. When the wireless device reselects a neighbor cell that belongs to a Tracking Area (TA) different from the TA of the current cell, the TA of the wireless device should be modified accordingly.

In some embodiments, multiple wireless devices collaborate in performing measurements and, control messages' reception and cell reselection procedures, as will be described below.

Figure 6:
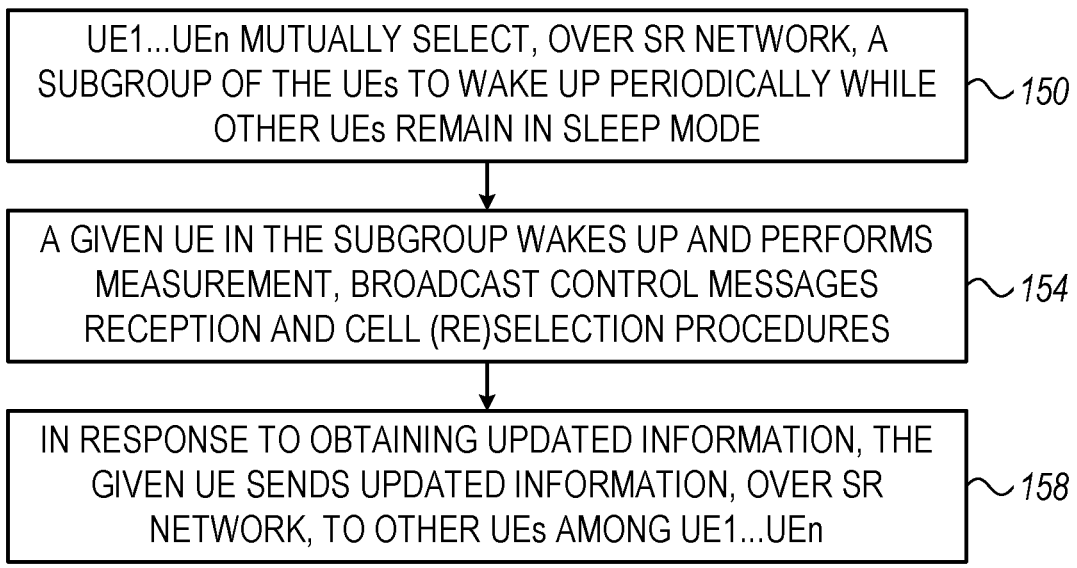
FIG. 6 is a flow chart that schematically illustrates a method for sharing measurement, BS control messages and any other cell (re)selection information, over a SR network, in accordance with an embodiment that is described herein.

FIG. 6 is a flow chart that schematically illustrates a method for sharing measurement, BS control messages and any other cell (re)selection information, over a SR network, in accordance with an embodiment that is described herein.

Note that a UE that wakes up for paging reception optionally performs measurements, receives broadcast control messages from the BS, and performs cell (re)selection in that wakeup period. In other words, typically only part of multiple UEs waking up, also perform measurements, broadcast control messages reception and cell (re)selection.

The method begins with a group of wireless devices denoted UE1 . . . UEn communicating over the SR network to mutually select a subgroup of these UEs that will wake up periodically, at a subgroup selection step 150. UEs among UE1 . . . UEn that were not selected at step 150 remain in sleep mode. UE1 . . . UEn may select the UEs in the subgroup in various ways, for example, based on the battery level of UE1 . . . UEn so that UEs having high battery level or long time before battery draining should be selected with higher priority than other UEs. Alternatively, selecting the UEs that will wake up periodically may be based on channel conditions with the BS, or the UEs may be selected sequentially, e.g., using a round robin approach. Note that step 150 of the present method may be executed as a preliminary step, before step 140 of the method in FIG. 5 above. In the example of FIG. 5 it is assumed that UE2 . . . UEn have already been selected.

At a waking up step 154, a given UE in the subgroup (or multiple UEs in the subgroup) wakes up and performs measurement, broadcast control messages reception and cell (re)selection procedures, as described above.

At a conditional reporting step 158, in response to obtaining updated information, the given UE sends (or multiple selected UEs send) the updated information, over the SR network, to other UEs among UE1 . . . UEn. For example, the given UE sends the updated information to UEs among UE1 . . . UEn that were not selected in the subgroup of UEs at step 150. The updated information may be indicative of various events, such as, (i) one or more neighbor cells have been detected, (ii) updated measurements were obtained, (iii) cell (re)selection criteria is met, (iv) cell (re)selection was performed and updated MIB and SIB were collected, and the like. Following step 158 the method terminates.

Using the method of FIG. 6 improves the battery usage (e.g., the time before the battery drains) of UEs not selected to wake up periodically. This is because the tasks of performing measurements and cell (re)selection that typically consume substantial amount of power (especially when the UEs are moving), are skipped. Moreover, a UE that has woken up and detects a neighbor cell, shares this information with other UEs in the group, including UEs that may have failed to detect the neighbor cell, thus reducing the probability of mis-detecting neighbor cells. The method of FIG. 6 is useful, for example, when the participating UEs are located close to one another (e.g., many UEs shipped in a truck), and therefore experience similar channel conditions, and see the same cells.

Efficient Discovery of Devices Over Short-Range Network

Wireless devices supporting short-range communication may establish a communication link with one another using a neighbor discovery procedure. In low-power ad-hoc networks such as Bluetooth Low Energy (BLE), a discovery scheme may be used, in which one device periodically transmits beacon signals and another device periodically scans for detecting the beacon signals. To save battery power, the two devices may transmit and scan beacon signals at a relatively long duty cycle, which undesirably increases discovery latency.

Figure 7:
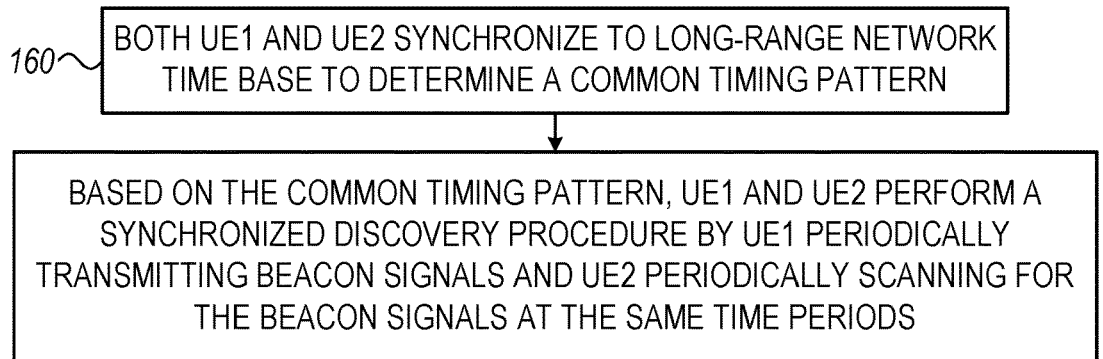
FIG. 7 is a flow chart that schematically illustrates a method for efficient SR device discovery by synchronizing to LR network time base, in accordance with an embodiment that is described herein.

FIG. 7 is a flow chart that schematically illustrates a method for efficient SR device discovery by synchronizing to LR network time base, in accordance with an embodiment that is described herein.

In the present example, the LR network comprises a LTE network, and two wireless devices denoted UE1 and UE2 that are assumed to be able to synchronize to a time base of the LR network. UE1 and UE2 may belong to the same LTE cell or to different LTE cells.

The method begins with each of UE1 and UE2 synchronizing to a time base of the LR network, at a synchronization to LR network step 160. For example, UE1 and UE2 may synchronize to the LTE System Frame Number (SFN) broadcasted by BS 36 in a System Information Block (SIB). By synchronizing to the same time base, both UE1 and UE2 determine a common timing pattern for device discovery as will be described below. In an embodiment, the common timing pattern specifies time periods at a selected duty cycle for transmitting and scanning for beacon signals. For example, the wakeup instances may be determined as SFN+ (time-offset). UE1 and UE2 may determine the timing pattern based on parameters of the LTE network such as, for example, the cell ID. For example, the wakeup instances are given by SFN+f(Cell ID), wherein f( ) is any suitable function known to the UEs. In this embodiment, wakeup times are distributed so that not all UEs wake up simultaneously.

In a variant embodiment, instead of synchronizing to the LTE time base, UE1 and UE2 receive from a remote server (e.g., server 44) over the cellular network a message specifying the common timing pattern to be used for discovery.

At a discovery step 164, UE and UE2 perform a synchronized discovery procedure based on the common timing pattern of step 160. To this end, based on the common timing pattern, UE1 periodically transmits beacon signals at the time periods specified in the timing pattern, and UE2 periodically scans for detecting beacon signals at the same time periods in which UE1 transmits the beacon signals. Following step 204, the method terminates.

In some embodiments, a UE 24 supports multiple different timing patterns for performing neighbor discovery. For example, the UE may use for discovery time periods synchronized to a time base of the cellular network, as described above, and additionally use other time periods for discovering devices supporting short-range communication but without being synchronized to the time base of the cellular network.

Using the described method, a UE scans for detecting beacon signals only during time periods in which another UE is expected to transmit the beacon signals. Therefore, UEs applying this discovery consume reduced power, use battery efficiently, and require shorter discovery latency compared to UEs using conventional non-synchronized discovery methods.

Sharing Location and Other Information Among Wireless Devices Over Short-Range Network In some embodiments, wireless devices 24 support determining and reporting geographical location. In some embodiments, wireless device 24 comprises sensors (not shown) for measuring local physical attributes such as geographical location, temperature and humidity. Wireless device 24 may report its geographical location, and possibly other measured physical attributes, to server 44 over LR network 32. This may be useful, for example, in tracking objects shipped together, e.g., in a vehicle.

In the context of the present disclosure and in the claims, the term "physical attribute" refers to any suitable measurable physical attribute, including geographical location, temperature and humidity, for example.

Processor 60 may determine the geographical location of wireless device 24 in various ways. In some embodiments, the wireless device comprises a Global Navigation Satellite System (GLASS) receiver (not shown) that determines location information (longitude, latitude, and altitude) using time signals transmitted from satellites, and reports the location information to processor 60. In other embodiments, the processor of the wireless device acquires geolocation information using a Wi-Fi Positioning System (WPS) comprising multiple nearby Wi-Fi hotspots. Alternatively, in accordance with the Bluetooth v5.1 specification, location estimation may be based on methods such as Angle of Arrival (AoA) and Angle of Departure (AoD). In yet other embodiments, methods related to the cellular network such as the Observed Time Difference of Arrival (OTDOA) method can be used.

Figure 8:
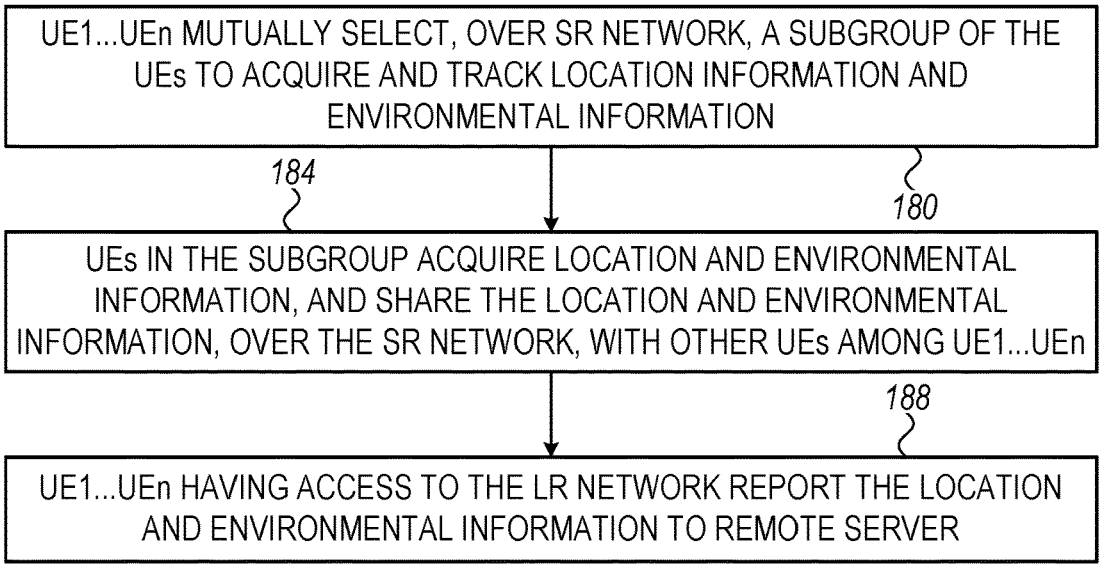
FIG. 8 is a flow chart that schematically illustrates a method for sharing location and other physical information over a SR network, in accordance with an embodiment that is described herein.

FIG. 8 is a flow chart that schematically illustrates a method for sharing location and other physical information over a SR network, in accordance with an embodiment that is described herein.

The method begins with a group of UEs 24 denoted UE1 . . . UEn mutually selecting, over SR network 28, a subgroup of the UEs to acquire and track location and other physical information, at a subgroup selection step 180. Alternatively, server 44 sends to the UEs over the LR network, information specifying the selected UEs in the subgroup. The physical information may comprise environmental attributes such as temperature and humidity.

Selecting the UEs in the subgroup may be carried out using any suitable method, e.g., based on an expected precision in measuring the location at the UEs. In GNSS, for example, the location precision typically depends on the level of the signals received from the satellites, on the number of satellites seen by the UE, and the like. Alternatively or additionally, other suitable selection criteria such as battery level can also be used.

At a sharing step 184, the UEs in the subgroup acquire location and environmental information (physical attributes, e.g., temperature), and the respective processors (60) of these UEs share this information, over the SR network, with processors 60 of other respective UEs among UE1 . . . UEn. At a reporting step 188, processor 60 of one or more UEs among UE1 . . . UEn having access to the LR network, report the location and environmental information to server 44 via BS 36. Following step 184, the method terminates.

In some embodiments, location information collected from multiple UEs is combined, to further increase the accuracy in location estimation. In an embodiment, combining the location information is carried out by one of the UEs. Alternatively, the UEs send raw (or partially processed) location information to the remote server, which determines the accurate location based on the multiple locations reported.

Combining the location information is not limited to using same-type location technology. For example, location information can be fused from BLE, OTDOA, information extracted from the SR network and GNSS measurements, and distributed to UEs over the SR network. Information extracted over the SR network may comprise, for example, measured distances among pairs of UEs.

In some embodiments, UE1 . . . UEn are located in close proximity to one another and therefore have similar locations and similar environmental conditions such as temperature and humidity. For example, the UEs may comprise low-cost wireless devices attached to packages shipped in a vehicle. In some embodiments, multiple UEs locally measure environmental attributes, and collaborate to combine measurements from multiple UEs for improving estimation precision similarly to combining the location information as described above. In some embodiments, a single UE may be selected for transmitting the location and physical attributes to remote server 44, on behalf of the some or all of the UEs in the group of UEs. This is beneficial in terms of communication cost, network loading and battery life.

Colaborative Security

As noted above, wireless device 24 comprise respective SEs that can be used (e.g., by the processors of wireless devices 24) for establishing mutual trust across the SR network. The secure SR network may serve for short-range secure communication among the wireless devices, as described above.

In the description that follows, keys used by the wireless device to access the LR network are also referred to herein as "long-range keys," and keys used for establishing secure communication over the SR network are also referred to as "short-range keys."

In some embodiments, multiple wireless devices 24 share over the SR network one or more identities and one or more long-range keys (which relate to the LR network) that are conventionally used by the wireless devices for accessing the LR network. For example, UE1 may send its identities and long-range keys to UE2 over the secure SR network, and then UE2 may communicate over the LR network, on behalf of UE1, using this shared information. In LTE, such shared information may comprise the KASME and TMSI. KASME is derived from the iK key (used for integrity protection) and from the cK key (used for encryption) which are generated by SIM card functionality applying a suitable key derivation process.

UE1 may initiate the generation of the identities and long-range keys and transmit them to other UEs over the secure SR network before they are needed. Alternatively, UE1 receives a request to provide the identities and long-range keys, e.g., from another UE, before the other UE establishes communication with the LR network.

Alternatively, UE1 may send over the SR network the LR communication root-of-trust (long-range keys) and identities (e.g. K, IMSI) using trusted protocol such as the Remote SIM Provisioning (RSP) protocol by the GSM Association (GSMA).

Sharing identities and long-range keys as described above may be advantage in various aspects. For example, UE2 that communicates over the LR network may experience better channel conditions with the BS then UE1, and therefore consumes lower power than UE1 in communicating with BS 36. As another example, UE2 may communicate over the LR network on behalf of UE1 when the UE1 having low battery level or is close to battery draining. A UE may also share its long-range keys with multiple UEs serving as gateway devices for receiving downlink broadcasted information.

In some embodiments, wireless devices 24 are initially deployed without activating their respective SIM cards. This means that a root-of-trust (long-range) key is configured into the SIM card of the wireless device and into the core network, e.g., within the Home Subscriber Server (HSS), but the SIM card is not activated or on-boarded at the LR core network, which means that the wireless device is not eligible to get service from the LR network. As noted above, in some embodiments, one or more UEs serve as gateway devices toward the LR network for other UEs. In these embodiments, only UEs that access the LR network need to be activated. The other UEs remain un-activated and may access the LR network, indirectly, by communicating with the gateway devices over the SR network. Since some of the UEs remain un-activated, connectivity costs (which relate to SIM activation) over the LR network are reduced. Selective activation as described above, may be used, for example, in applications deploying stationary wireless devices such as smart meters.

In some embodiments, the operating system or some other software or application run by processor 60 of wireless device 24 needs to be updated. Such updates may be carried out by sending, over the LR network, an updated firmware image of the software to the wireless device. An updating process of this sort is also referred to as "Firmware-Over-The-Air" (FOTA). In some embodiments, the firmware image is encrypted before being sent over the LR network, and the receiving wireless device decrypts the firmware image to be installed, e.g., using SE 68. The firmware image may be sent to multiple wireless devices in parallel. When the size of the firmware image (e.g., in bytes) is large, it may take a long time to download the image into the wireless devices, which undesirably consumes a large amount of battery power.

In some embodiments, multiple UEs collaborate in downloading an updated firmware image. In an embodiment, a group of UEs 24 denoted UE1 . . . UEn first communicate with one another over the SR network to establish secure communication over the SR network, as described above. UE1 . . . UEn then communicate over the secure SR network to mutually select one or more UEs in the group that will serve as gateway devices for receiving the updated firmware image over the LR network, on behalf of the entire group of UEs (or some of the UEs in the group). Selecting the gateway devices may depend on any suitable criteria such as the battery level of the UEs or whether the UEs are wall-powered, channel state with BS 36, Signal to Noise Ratio (SNR) of the signal received from the BS, and the like. The UEs selected to serve as gateway devices receive an updated firmware image from BS 36, and send the updated image to other UEs in the group over the secure SR network. In an embodiment, each gateway device receives from the BS, and sends to other UEs over the SR network, only a partial part of the firmware image. A UE that receives all the parts rebuilds the full firmware image. In some embodiments, each gateway device locally decrypts the received firmware image (or part thereof), and re-encrypts it for transmission over the SR network using encryption keys derived for the group of UEs during the trust establishment phase. The encryption keys used in such a re-encryption scheme are typically different from the encryption keys used to encrypt the firmware image for downloading over the LR network.

Issues Related to Coexistence of Multiple Radio Networks

Wireless devices may suffer from interferences due to simultaneous communication over multiple different radio networks. For example, in wireless device 24, uplink high-power transmissions via LR transceiver 52 may leak and block or interfere with reception at the receiver part (not shown) of SR transceiver 56 of the same or another wireless device. Similarly, transmissions via SR transceiver 56 possibly leak into the receiver part of LR transceiver 52 of the same or another wireless device.

In some embodiments, LR transceiver 52 and SR transceiver 56 comprise filters designed to filter out transmissions in frequencies or frequency bands of the other transceiver. In low-cost devices, however, such as certain types of IoT devices, such filtering is typically insufficient when one of LR transceiver 52 and SR transceiver 56 is transmitting and the other transceiver receiving at the same time and using close frequencies.

In some embodiments, to avoid interferences due to simultaneous communication over both the LR network and the SR network, a Time Domain Multiplexing (TDM) approach is adopted, for allocating different time slots for communication over the SR and LR networks. Depending on the terminology used in the underlying LR network, time slots may also refer to as "time windows," "frames", "sub-frames" and the like.

As will be described below, implementing the TDM approach may rely on utilizing gaps in communication that normally exist in accordance with the communication protocol of one of the SR and LR networks.

In some embodiments, multiple UEs synchronize to a common time base of the LR network, and time slots for TDM-based operation are determined using the common time base. In LTE, for example, the common time base may be related to the LTE SFN index.

Figure 9:
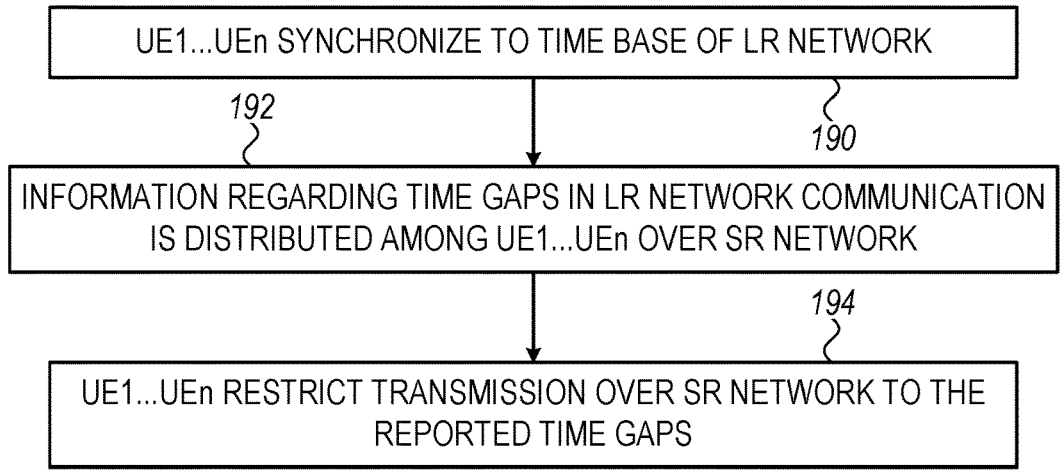
FIG. 9 is a flow chart that schematically illustrates a method for time-coordinated communication over SR network and LR network to avoid interference, in accordance with an embodiment that is described herein.

FIG. 9 is a flow chart that schematically illustrates a method for time-coordinated communication over SR network and LR network to avoid interference, in accordance with an embodiment that is described herein.

The method begins with a group of UEs 24 denoted UE1 . . . UEn synchronizing to a common time base of the LR network, at a synchronization step 190. For example, UEs in the group having access to the LR network synchronize to the LR network time base, and send synchronization information, over the SR network, to other UEs in the group. In LTE, the time base may be related to the LTE SFN.

At a gap-determination step 192, in accordance with the underlying LR network protocol, information regarding time gaps during which no wireless communication occurs over the cellular network, is distributed among UE1 . . . UEn over the SR network. As such, no reception is expected during these time gaps by LR transceiver 52. The information regarding the time gaps information may be provided, for example, by remote server 44, or by one of the UEs in the group. For example, in Narrowband Internet of Things (NB-IoT)—a Low Power Wide Area Network (LPWAN) radio technology based on a subset of the LTE standard, several types of subframe gaps may be used. For example, in I-DRX mode—sleep times can be used, and in C-DRX—time gaps between transmissions and receptions can be used.

At a restricted transmission step 194, UE1 . . . UEn transmit over the SR network only during the time gaps reported at step 192. Following step 194 the method terminates.

In some alternative embodiments, no information regarding time gaps of the LR network is distributed among the UEs. Instead, the UEs are configured to a default listening mode over the SR network, and a gateway device communicates over the SR network with other UEs during LR network time gaps that occur during RRC-connected periods, e.g., gaps in switching between transmission and reception, C-DRX, and the like)

The embodiments described above are given by way of example, and other suitable embodiments can also be used. For example, in some of the embodiments above, multiple UEs collaborate, e.g., for mutually selecting a UE or for making some other decision, by communicating with one another over the SR network. In alternative embodiments, the UE selection or other decision is provided to one or more UEs by a remote server (e.g., server 44) over the LR network and distributed to other UEs over the SR network.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A communication device, comprising:
    a long-range transceiver, configured to communicate wirelessly with a Base Station (BS) of a cellular network;
    a short-range transceiver, configured to communicate wirelessly with one or more peer communication devices over a short-range network; and
    a processor, configured to:
        communicate with the peer communication devices via the short-range transceiver and with the BS via the long-range transceiver, so as to share resources between the communication device and the peer communication devices or the cellular network, for providing to a peer communication device a communication service that includes communication with the BS,
        wherein, to provide the communication service, the communication device is to:
            connect itself to the BS (i) on behalf of the peer communication device and (ii) by identifying itself to the BS by an identity of the peer communication device;
            receive from the peer communication device (i) a packet and (ii) metadata specifying transmission parameters for relaying the packet, the transmission parameters comprising one or more of a Modulation and Coding Scheme (MCS), a frequency and a timing; and
            based on the metadata, transmit to the BS a relayed packet that is identical to the packet received from the peer communication device, thereby rendering the cellular network unaware that the communication service is provided via the communication device.

2. The communication device according to claim 1, wherein the processor is configured to receive from the peer communication device, via the short-range transceiver, a signal that conveys data bits and that underwent partial or complete transmit processing by a long-range transceiver of the peer communication device for transmission to the BS, to complete processing the signal, by the long-range transceiver of the communication device, for producing a transmission signal that carries the data bits, and to transmit the transmission signal to the BS, on behalf of the peer communication device.

3. The communication device according to claim 1, wherein the processor is configured to communicate via the short-range transceiver with the peer communication devices in mutually selecting one or more gateway devices for jointly mediating communication of messages between the BS via the long-range transceiver and peer communication devices via the short-range transceiver.

4. The communication device according to claim 3, wherein the processor is configured to select the gateway devices, mutually with the peer communication devices, based on a criterion selected from a criteria list comprising-channel conditions with the BS, battery level or an amount of time left before the battery drains, connectivity costs to the long-range network, level of connectivity performance offered by Mobile Virtual Network Operator (MVNO), number of routing hops in the short-range network, application considerations and device capabilities.

5. The communication device according to claim 1, wherein the communication device and the peer communication devices comprise respective Secure Elements (SEs), and wherein the processor is configured to establish secure communication with the peer communication devices over the short-range network, using the SEs.

6. The communication device according to claim 1, wherein the processor is configured to render the cellular network unaware that the communication service is provided via the communication device, by:
    receiving from the peer communication device, via the short-range transceiver using secure communication, one or more identities and one or more keys used by the peer communication device to access the cellular network; and
    accessing the cellular network using the received identities and keys, on behalf of the peer communication device.

7. The communication device according to claim 1, wherein the processor is configured to receive a downlink message from the BS via the long-range transceiver, and to transmit the downlink message, via the short-range transceiver, to the peer communication device.

8. The communication device according to claim 1, wherein the long-range transceiver is configured to wake up periodically from Idle mode, and wherein during a wakeup period the processor is configured to perform one or both of:
    receive, via the long-range transceiver, a control message sent by the BS, and send the control message to a given peer communication device via the short-range transceiver; and
    produce measurements related to channel quality and to neighbor cells, and send the measurements to a given peer communication device via the short-range transceiver.

9. The communication device according to claim 1, wherein the long-range transceiver is configured to wake up periodically for detecting, on behalf of a given peer communication device that remains in an Idle mode, paging messages destined to the given peer communication device, to detect, during a wakeup period, a paging message destined by the BS to the given peer communication device, and to send the paging message to the processor, and wherein the processor is configured to transmit the paging message to the given peer communication device via the short-range transceiver.

10. The communication device according to claim 1, wherein the processor is configured to receive from a given peer communication device, via the short-range transceiver, information regarding time gaps during which no wireless communication occurs over the cellular network, and to communicate with the peer communication devices via the short-range transceiver during the time gaps.

11. The communication device according to claim 1, wherein the processor is configured to synchronize to a time base of the cellular network, to which a given peer communication device also synchronizes, the and to perform synchronized discovery between communication device and the given peer communication device, in accordance with the time base.

12. The communication device according to claim 1, wherein the processor is configured to measure a local physical attribute, and to share the measured physical attribute with one or more peer communication devices via the short-range transceiver.

13. The communication device according to claim 1, wherein the processor is configured to receive from one or more peer communication devices respective attributes measured locally, to derive from the one or more attributes a common attribute, and to report the common attribute to a server coupled to the BS, via the long-range transceiver.

14. The communication device according to claim 1, wherein the communication device belongs to a group comprising one or more communication devices that receive from the BS different respective parts of a firmware image, or an entire firmware image, destined to a target communication device, wherein the processor is configured to receive a respective part of the firmware image or the entire firmware image from the BS, and to send the received part or the entire firmware image to the target communication device over the short-range network.

15. The communication device according to claim 1, wherein the processor is configured to communicate messages with the BS via the long-range transceiver on behalf of one or more peer communication devices that are un-activated or not on-boarded in the cellular network.

16. A method for communication comprising:
in a communication device comprising a long-range transceiver for wireless communication with a Base Station (BS) of a cellular network, and further comprises a short-range transceiver for wireless communication with one or more peer communication devices over a short-range network,
communicating with the peer communication devices via the short-range transceiver and with the BS via the long-range transceiver, so as to share resources between the communication device and the peer communication devices or the cellular network, for providing to a peer communication device a communication service that includes communication with the BS,
further comprising performing by the communication device, to provide the communication service:
connecting itself to the BS (i) on behalf of the peer communication device and (ii) by identifying itself to the BS by an identity of the peer communication device;
receiving from the peer communication device (i) a packet and (ii) metadata specifying transmission parameters for relaying the packet, the transmission parameters comprising one or more of a Modulation and Coding Scheme (MCS), a frequency and a timing; and
based on the metadata, transmitting to the BS a relayed packet that is identical to the packet received from the peer communication device, thereby rendering the cellular network unaware that the communication service is provided via the communication device.

17. The method according to claim 16, wherein communicating with the peer communication devices comprises receiving from the peer communication device, via the short-range transceiver, a signal that conveys data bits and that underwent partial or complete transmit processing by a long-range transceiver of the peer communication device for transmission to the BS, and wherein providing the communication service comprises completing processing the signal, by the long-range transceiver of the communication device, for producing a transmission signal that carries the data bits, and to transmit the transmission signal to the BS, on behalf of the peer communication device.

18. The method according to claim 16, wherein communicating with the peer communication devices comprises communicating via the short-range transceiver with the peer communication devices in mutually selecting one or more gateway devices for jointly mediating communication of messages between the BS via the long-range transceiver and peer communication devices via the short-range transceiver.

19. The method according to claim 18, and comprising selecting the gateway devices, mutually with the peer communication devices, based on a criterion selected from a criteria list comprising channel conditions with the BS, battery level or an amount of time left before the battery drains, connectivity costs to the long-range network, level of connectivity performance offered by Mobile Virtual Network Operator (MVNO), number of routing hops in the short-range network, application considerations and device capabilities.

20. The method according to claim 16, wherein the communication device and the peer communication devices comprise respective Secure Elements (SEs), wherein communicating with the peer communication devices comprises establishing secure communication with the peer communication devices over the short-range network, using the SEs.

21. The method according to claim 16, wherein rendering the cellular network unaware that the communication service is provided via the communication device comprises receiving from the peer communication device, via the short-range transceiver using secure communication, one or more identities and one or more keys used by the peer communication device to access the cellular network, and accessing the cellular network using the received identities and keys, on behalf of the peer communication device.

22. The method according to claim 16, and comprising receiving a downlink message from the BS via the long-range transceiver, and transmitting the downlink message, via the short-range transceiver, to the peer communication device.

23. The method according to claim 16, and comprising waking up periodically from Idle mode, by the long-range transceiver, and, during a wakeup period, performing one or both of:
receiving via the long-range transceiver, a control message sent by the BS, and sending the control message to a given peer communication device via the short-range transceiver; and
producing measurements related to channel quality and to neighbor cells, and sending the measurements to a given peer communication device via the short-range transceiver.

24. The method according to claim 16, and comprising waking up periodically by the long-range transceiver for detecting, on behalf of a given peer communication device that remains in an Idle mode, paging messages destined to the given peer communication device, detecting, during a wakeup period, a paging message destined by the BS to the given peer communication device, sending the paging message to the processor, and transmitting the paging message to the given peer communication device via the short-range transceiver.

25. The method according to claim 16, wherein communicating with the peer communication devices comprises receiving from a given peer communication device, via the short-range transceiver, information regarding time gaps during which no wireless communication occurs over the cellular network, and communicating with the peer communication devices via the short-range transceiver during the time gaps.

26. The method according to claim 16, and comprising synchronizing to a time base of the cellular network, to which a given peer communication device also synchronizes, and performing synchronized discovery between the communication device and the given peer communication device, in accordance with the time base.

27. The method according to claim 16, and comprising measuring a local physical attribute, and sharing the measured physical attribute with one or more peer communication devices via the short-range transceiver.

28. The method according to claim 16, wherein communicating with the peer communication devices comprises receiving from one or more peer communication devices respective attributes measured locally, deriving from the one or more attributes a common attribute, and reporting the common attribute to a server coupled to the BS, via the long-range transceiver.

29. The method according to claim 16, wherein the communication device belongs to a group comprising one or more communication devices that receive from the BS different respective parts of a firmware image, or an entire firmware image, destined to a target communication device, and comprising receiving a respective part of the firmware image or the entire firmware image from the BS, and sending the received part or the entire firmware image to the target communication device over the short-range network.

30. The method according to claim 16, and comprising communicating messages with the BS via the long-range transceiver on behalf of one or more peer communication devices that are un-activated or not on-boarded in the cellular network.

* * * * *